(12) United States Patent
Boland et al.

(10) Patent No.: US 6,665,532 B1
(45) Date of Patent: Dec. 16, 2003

(54) ALTERNATIVE MESSAGE USAGE FOR VOICE MAIL RETREIVAL VIA REVERTIVE CALLING

(75) Inventors: Richard Robert Boland, LaGrange, IL (US); Patrick Joseph Boyle, Naperville, IL (US); Ismael Lopez, Jr., Berwyn, IL (US); Mark Alan McCormick, Naperville, IL (US); Salvatore Suero, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/412,282

(22) Filed: Oct. 5, 1999

(51) Int. Cl.[7] .............................................. H04M 11/10
(52) U.S. Cl. .................................... 455/413; 455/412.1
(58) Field of Search ........................... 455/412, 1, 413, 455/414.1, 415, 414.2, 432, 433, 561, 560, 412.2, 416, 417

(56) References Cited

U.S. PATENT DOCUMENTS

| | | | | | |
|---|---|---|---|---|---|
| 5,758,279 | A | * | 5/1998 | Foti | 455/412 |
| 5,839,064 | A | | 11/1998 | Foti | 455/413 |
| 6,011,969 | A | * | 1/2000 | Vargas et al. | 455/423 |
| 6,014,559 | A | * | 1/2000 | Amin | 455/413 |
| 6,032,043 | A | * | 2/2000 | Houde | 455/433 |
| 6,131,028 | A | * | 10/2000 | Whitington | 455/417 |
| 6,178,322 | B1 | * | 1/2001 | Creech | 455/412 |
| 6,236,857 | B1 | * | 5/2001 | Calabrese et al. | 455/422 |
| 6,253,081 | B1 | * | 6/2001 | Koster | 455/433 |
| 6,256,512 | B1 | * | 7/2001 | Verdonk | 455/462 |
| 6,282,416 | B1 | * | 8/2001 | Verdonk | 455/412 |
| 6,295,449 | B1 | * | 9/2001 | Westerlage et al. | 455/412 |
| 6,301,473 | B1 | * | 10/2001 | Nguyen et al. | 379/212.01 |
| 6,333,973 | B1 | * | 12/2001 | Smith et al. | 379/88.12 |
| 6,368,205 | B1 | * | 4/2002 | Frank | 455/413 |
| 6,498,930 | B1 | * | 12/2002 | Mamaghani | 455/413 |
| 6,535,730 | B1 | * | 3/2003 | Chow et al. | 455/416 |

FOREIGN PATENT DOCUMENTS

WO    WO 95/12268    5/1995

OTHER PUBLICATIONS

"Cellular Radiotelecommunications Intersystem Operations", Chapter 1: Functional Overview, TIA/EIA–41–D, TIA/EIA–41.1–D, (Initial ANSI publication–1997).

(List continued on next page.)

*Primary Examiner*—Charles Appiah

(57) ABSTRACT

A mobile switching center (MSC) in accordance with the principles of the present invention provides access to a subscribers voice message center from the subscriber's roaming mobile station. The MSC is responsive to a "RemoteFeatureRequest" Invocation by the roaming mobile station in which the subscriber's directory number is the same as the dialed digits by routing the call from the mobile station to the subscriber's voice message center. The MSC may also be responsive to a "OriginationRequest" employing the subscriber's directory number as the dialed digits by routing the roaming mobile station's call to the subscriber's voice message center. If the MSC supports both RemoteFeatureRequest-, and OriginationRequest-based access to the subscriber's voice message center, the MSC determines which of the approaches to use in response to the reception of a subscriber's directory number as the dialed digits from the subscriber's roaming mobile station. The MSC may make this determination on the basis of information stored in a local database that indicates the method employed by other telecommunications devices, such as other MSCs, Visiting Location Registers (VLR), or Home Location Registers (HLR), within the system. One of the methods, that is, the use of an Origination Invocation or the use of a RemoteFeatureRequest invocation, may be chosen as a default method.

12 Claims, 2 Drawing Sheets

OTHER PUBLICATIONS

"Cellular Radiotelecommunications Intersystem Operations", Chapter 2: Intersystem Handoff Information Flows, TIA/EIA–41.2–D, (Initial ANSI publication–1997).

"Cellular Radiotelecommunications Intersystem Operations", Chapter 3: Automatic Roaming Information Flows, TIA/EIA–41.3–D, (Initial ANSI publication–1997).

"Cellular Radiotelecommunications Intersystem Operations", Chapter 4: Operations, Administration, and Maintenance Information Flows and Procedures, TIA/EIA–41.4–D, (Initial ANSI publication–1997).

"Cellular Radiotelecommunications Intersystem Operations", Chapter 5: Signaling Protocols, TIA/EIA–41.5–D, (Initial ANSI publication–1997).

"Cellular Radiotelelcommunications Intersystem Operations", Chapter 6: Signaling Procedures, TIA/EIA–41.6–D, (Initial ANSI publication–1997).

Ming–Chwan Chow, "Understanding Wireless Digital Mobile, Cellular and PCS", *Chapter 2—Wireless Network Architectures and Components/Functions, Chapter 3—Call Processing, HLR, VLR and Handoff*, Andan Publisher, Holmdel, New Jersey, pp 2–1 through 3–54, 1998.

European Search Report, (EP 00308377.1–2209–), Feb. 15, 2001.

\* cited by examiner

ALTERNATIVE MESSAGE USAGE FOR VOICE MAIL RETREIVAL VIA REVERTIVE CALLING

FIELD OF THE INVENTION

The invention relates to wireless telecommunications, and, more particularly, to voice mail retrieval from a roaming mobile station.

BACKGROUND OF THE INVENTION

The use of mobile telecommunications systems, including cellular telephones and personal communications services (PCS), has seen explosive growth, particularly in the past decade. The use of mobile, or cellular, telephones has become so commonplace that it is not unusual to see people conversing on the telephone as they walk along the sidewalk, as they drive, as they sit poolside, or as they attend a sporting event. There is a very real need being met by mobile systems. However unfortunate it may be, people tend to work longer hours now and are under a great deal of pressure to "multi-task" as much as possible. Mobile telecommunications systems allow them to do this.

A mobile telecommunications subscriber who "roams", that is, travels outside his home service area, may wish to access his "voice mail" as he travels. One approach to providing access to a user's voice mail is to employ a special "star code" feature, that is, a feature which requires a user to key in a special series of digits on his mobile station. One example of such codes is the familiar star 69 (*69), which provides the user with the directory number of the most recent incoming call. Remembering the various star code digit sequences can be a frustrating, inconvenient, and confusing task. To avoid the confusion and frustration associated with the star code approach some telecommunications systems allow a roaming user to dial his own directory number. The system attempts to deliver the call, but, since the mobile station is outside the range of its home mobile switching center (MSC), the call cannot be completed. After the call fails, the system establishes a default connection to the user's message recording service, at which point the subscriber may access his recorded messages. Although it has the benefit of obviating the use of special star code sequences, this is an awkward, time-consuming approach which anyone who has been forced to listen through several tiers of selections offered by an automated call distribution system will recognize as an incredibly frustrating experience. Additionally, this approach consumes telephone system resources that might otherwise be put to better use.

Systems which employ "OriginationRequest" invocations to allow a subscriber to access his voice mail as he roams have been proposed. Such systems are discussed, for example, in TIA/EIA SP-3588, which is hereby incorporated by reference. Although such an approach may be effective for new systems, a huge installed base of telephony equipment does not support such an approach. A system that provides greater flexibility in providing access to voice mail, one which provides other means of access to voice mail for a roaming subscriber, would be highly desirable.

SUMMARY

A mobile switching center (MSC) in accordance with the principles of the present invention provides access to a subscriber's voice mail message from the subscriber's roaming mobile station. The MSC is responsive to a "RemoteFeatureRequest" invocation by the roaming mobile station in which the subscriber's directory number is the same as the dialed digits by routing the call from the mobile station to the subscriber's voice mail. The MSC may also be responsive to a "OriginationRequest" employing the subscriber's directory number as the dialed digits by routing the roaming mobile station's call to the subscriber's voice mail system. If the MSC supports both RemoteFeatureRequest-, and OriginationRequest-based access to the subscriber's voice mail, the MSC determines which of the approaches to use in response to the reception of a subscriber's directory number as the dialed digits from the subscriber's roaming mobile station. The MSC may make this determination on the basis of information stored in a local database that indicates the method employed by other telecommunications devices, such as other MSCs, Visiting Location Registers, or Home Location Registers, within the system. One of the methods, that is, the use of an OriginationRequest invocation or the use of a RemoteFeatureRequest invocation, may be chosen as a default method.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

For clarity of exposition, the conceptual block diagrams, which follow, may not include many components that may be incorporated in an actual system. Similarly, for the sake of simplicity and clarity, the following call scenario diagrams may delete some of the steps that may be involved in establishing calls. These deleted components and steps are known and are discussed, for example, in, Ming-Chwan Chow, Understanding Wireless Digital Mobile, Cellular and PCS, Andan Publishers, Holmdel, N.J., 1998 pp 2-1 through 3-54 which are hereby incorporated by reference.

Figure 1:
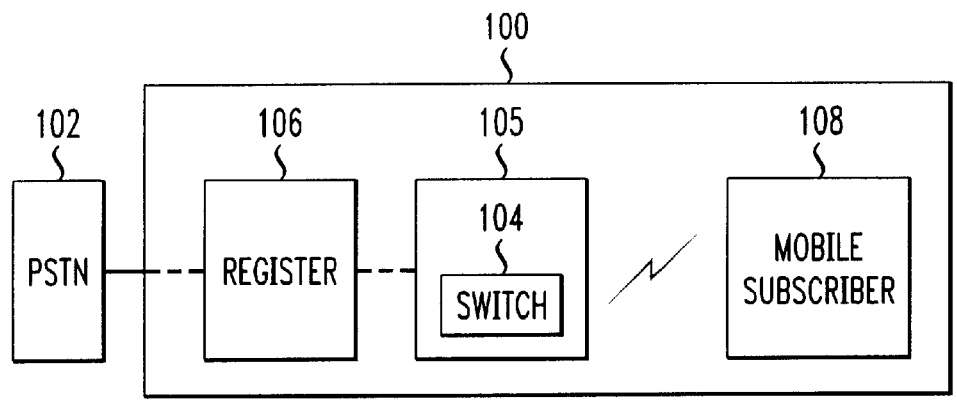
FIG. 1 is a conceptual block diagram of a mobile communications system in accordance with the principles of the present invention, in combination with a publicly switched telephone network.

The conceptual block diagram of FIG. 1 illustrates a mobile telecommunications system 100 in accordance with the principles of the present invention. The mobile system 100 may be operated in conjunction with the publicly switched telephone network 102. The mobile telecommunications system 100 includes a serving system 105 and a home location register 106, which communicate with one another. The serving system may include one or more visiting location registers and one or more base stations, for example. In particular, the mobile telecommunications system 100 includes at least one switching component 104, such as a mobile switching center (MSC), at least one registering component 106, such as a home location register (HLR), and at least one mobile station 108. The mobile station 108 may be of the mobile identification number (MIN) type, international mobile subscriber identity (IMSI) type, MIN-based IMSI type, or both MIN-based IMSI and IMSI type.

In accordance with the principles of the present invention, the mobile telecommunications system 100 establishes a connection from a land station, as follows. When a call is directed to a mobile station 108 from the publicly switched telephone network 102, the land system routes the call to the appropriate switching component 104 (only one of which is shown in this Figure) within the mobile system. The switching component 104 forwards the dialed digits, along with other information, to the registering component 106 to which the mobile station is assigned, and requests routing information for the mobile station 108 associated with the dialed digits. In response to the request for routing information, the registering component 106 returns routing information to the switching component 104. In accordance with the principles of the present invention, the serving system 105 includes a database that may be located within the registering component 106, for example. The database includes the association between the mobile's identifier (MIN or IMSI) and the mobile's directory number. This information may be relayed to the switching component 104, for example.

As will be described in greater detail in the discussion related to FIG. 3, a roaming mobile station 108 may initiate a call by sending dialed digits and an identifier to the serving system 105. In response, the serving system queries a database to determine how to route the call. If the mobile station 108 sends its own directory number or mobile subscriber identifier (MSID) as the dialed digits, the serving system indicates that this mobile is supported by voice mail retrieval via revertive calling (VMR-RC), and that the mobile station's voice message center may be accessed through a RemoteFeatureRequest invocation, the serving switch 104 sends a RemoteFeatureRequest invocation to the mobile station's associated register 106. The register 106 responds to the RemoteFeatureRequest invocation by sending the mobile station's voice mail digits to the serving switch 104. The serving switch employs these digits to complete the call, thereby permitting user of the mobile station 108 to access his voice mail system.

Figure 2:
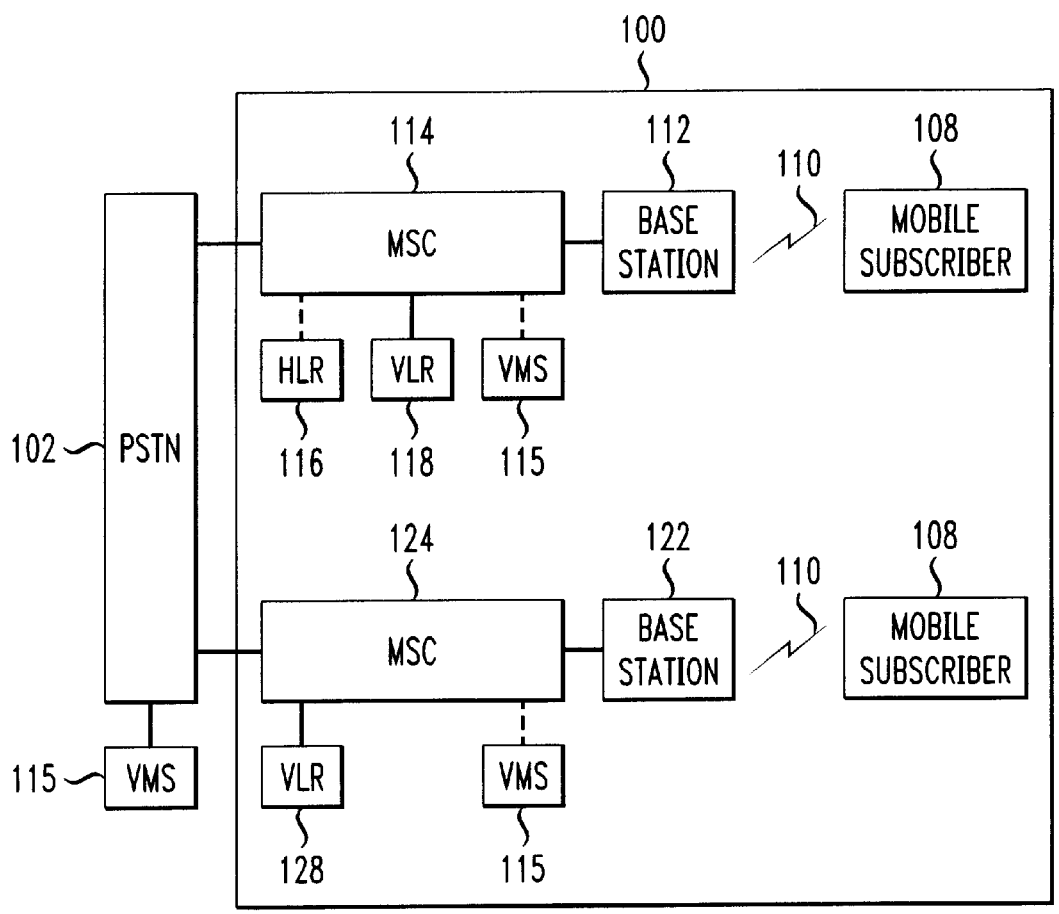
FIG. 2 is a more detailed conceptual block diagram of a mobile telecommunications system in accordance with the principles of the present invention.

The conceptual block diagram of FIG. 2 provides a more detailed view of a mobile telecommunications system in accordance with the principles of the present invention. The illustrative system 100 includes a mobile station 108, which may communicate, via a wireless link 110 with a base station 112. The base station, in turn, communicates with a mobile switching center 114 which operates as the switching component 104 in this illustrative embodiment. The mobile switching center 114 provides interfaces to the landline system 102 and to the remainder of the wireless, or mobile telecommunications system 100. The switching center 114 also provides mobility management for mobile stations. The mobile subscriber's voice messaging system 115 may be reached, directly or indirectly, through the MSC 114. In the following examples it is assumed that the MSC 114 is not the home MSC of the mobile station 108. That is, it is assumed that the mobile station 108 is roaming and interacting with a visiting MSC 114.

The mobile system 100 also includes a complement of components that operate in accordance with TIA/EIA 41D, a telecommunications standard that is hereby incorporated by reference in its entirety. These components include a home location register (HLR) 116, which operates as the registering component 106 in this illustrative embodiment. The HLR 116 may be reached from the MSC 114 through an indirect connection, as indicated by the broken line, and includes a database which may store, among other things, a permanent copy of the mobile subscriber's subscription information and location information which permits calls to be routed toward the mobile switching center associated with the mobile unit's current location. This information may include such things, as the mobile station roaming number (MSRN) or temporary local directory number (TLDN), the visiting location register (VLR) address, the mobile switching center (MSC) address), the international mobile subscriber identity (and the MIN, if available), the mobile subscriber ISDN number (MSISDN) teleservices and bearer services subscription information, and service restrictions, such as roaming limitations, and supplementary service parameters. A standalone HLR 116 supports such features as call delivery, message waiting notification, call forwarding, remote feature control, call transfer, subscriber PIN intercept, call waiting, conference calling, and voice message retrieval. A visited location register (VLR) 118, which functions, to some extent, as a home location register for a mobile station that is outside it home calling area, may be included in the system.

The system 100 would typically include additional mobile switching centers to service a roaming mobile station. With the mobile station 108 roaming it may communicate via a wireless link 120 with a base station 122. The base station 122 may communicate with a mobile switching center 124 that may have access to the home location register 116 of the mobile station, to a visited location register 128, or to the voice message center 115. These communications may be effected directly or, in the case of the home location register 116 or the voice message center 115, the communications may be realized through the public switched telephone network 102.

In this illustrative embodiment, the MSC 124 may include a data field which indicates that when a mobile station 108 attempts to establish a telephone call using its directory number as the dialed digits, the MSC 124 is to send a RemoteFeatureRequest Invoke to the mobile station's HLR 116. The invocation of a RemoteFeatureRequest is a type of direct feature request with call routing. The operation of a direct feature requests is known and described, for example, in EIA/41 D, 4.10.2 which is hereby incorporated by reference. The HLR responds by sending routing information to the visited MSC and the call is routed, either directly or indirectly, to the mobile station's voice message center. Additionally, the database may include information within the data field to indicate that the MSC is to send an OriginationRequest Invocation under the same set of circumstances. An MSC could then retrieve information from this data field and determine which approach to use with a given mobile station under this scenario. Use of an OriginationRequest invocation to retrieve voice mail is known and discussed, for example, in EIA/TIA SP3588 5.23.3, previously incorporated by reference. In accordance with the principles of the present invention an MSC may employ either the RemoteFeatureRequest invocation or an OriginationRequest invocation to connect a roaming mobile with its voice message center. Additionally, this voice mail retrieval via revertive calling feature, which encompasses the RemoteFeatureRequest or OriginationRequest approach may be activated or de-activated through an entry in a data field within the MSC. In an illustrative embodiment, the OriginationRequest approach is the default approach and the RemoteFeatureRequest approach is indicated by an entry in a data field in the MSC's database.

Figure 3:
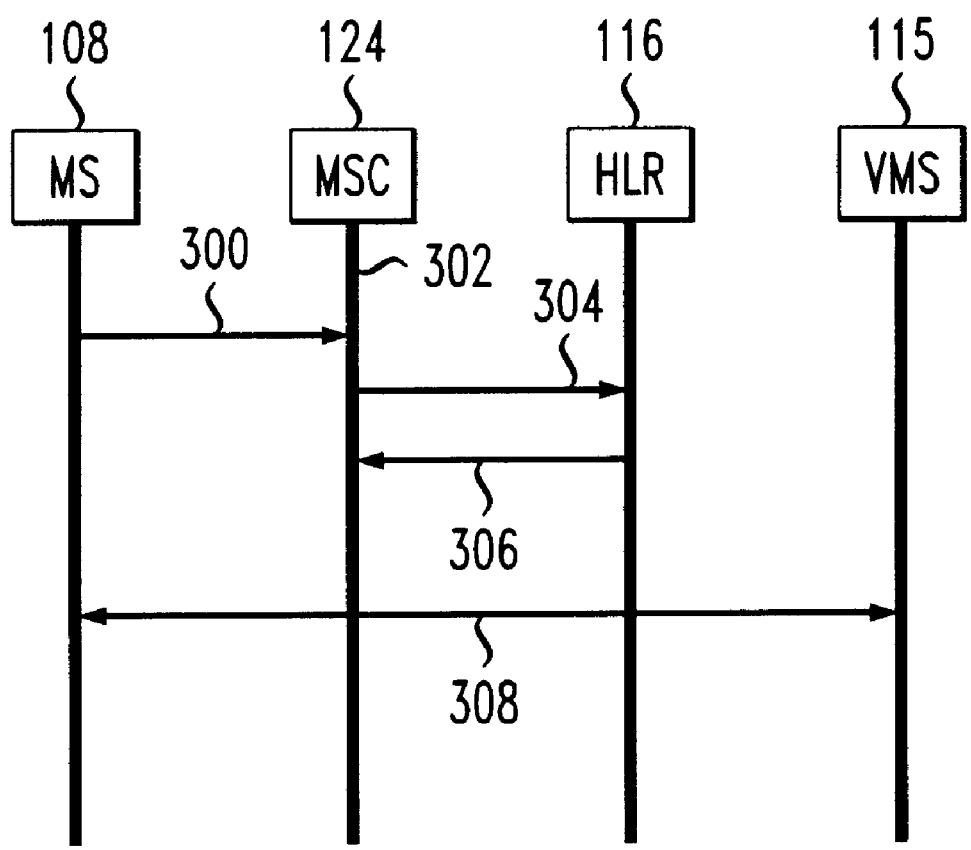
FIG. 3 is a call scenario diagram that illustrates the completion of a call from a roaming mobile to the mobile station's associated voice mail system.

The call scenario diagram of FIG. 3 illustrates, in broad strokes, a mobile station's process of retrieving voice mail while it is roaming. In step 300 the subscriber initiates a call and information, including the subscriber's mobile identifier and the mobile station's directory number, is routed to a visited MSC 124 from the mobile station 108. In step 302 the visited MSC 124 determines that the mobile station is outside its home location and that the mobile's feature set includes activation of VMR-RC through use of a RemoteFeatureRequest invocation. In step 304 the visited MSC 124 sends a RemoteFeatureRequest invocation to the mobile stations' HLR 116. The visited MSC 124 may also encode the Billing ID, Dialed Digits, Electronic Serial Number, Mobile Identification Number, MSCID, and Transaction Capability. The Transaction Capability would indicate that the digits may be sent back in the termination list for routing by the visited MSC 124. In step 306 the HLR 116 responds by delivering the routing digits to the mobile station's message system 115 to the visited MSC 124. That is, the HLR 116 includes termination list parameters used to route the call to the mobile station's voice mail system "box" in the return result. And, in step 308, the visited MSC 124 establishes a connection between the mobile station 108 and the mobile station's voice message center 115 using the digits contained in the termination list parameters. In accordance with the principles of the present invention, the MSC may support both RemoteFeatureRequest and OriginationRequest Invocations in providing voice mail retrieval via revertive calling (VMR-RC). In such an MSC, step 302 would include the determination of whether the mobile station supports VMR-RC and, if it does, whether its HLR does so through a RemoteFeatureRequest Invocation or an OriginationRequest invocation. Following this determination the MSC would proceed accordingly, invoking either a RemoteFeatureRequest or OriginationRequest, as appropriate, in step 304.

The foregoing description of specific embodiments of the invention has been presented for the purposes of illustration and description. It is not intended to be exhaustive or to limit the invention to the precise forms disclosed, and many modifications and variations are possible in light of the above teachings. For example, although generally written in terms of cellular telephone systems, the invention may be used in conjunction with a personal communications services (PCS) system, with appropriate modifications known to those familiar with the art. The embodiments were chosen and described to best explain the principles of the invention and its practical application, and to thereby enable others skilled in the art to best utilize the invention. It is intended that the scope of the invention be limited only by the claims appended hereto.

What is claimed is:

1. Apparatus responsive to communications from a mobile station comprising:
   a database stored within a mobile telecommunications system the database including a mobile identifier associated with a mobile station;
   the database further including an indication that the apparatus is responsive to communications from a mobile station in which the mobile station sends its directory number as dialed digits by employing a RemoteFeatureRequest Invocation to connect the mobile station with the mobile station's voice messaging system; and,
   a controller which is responsive to communications from a mobile station in which the mobile station sends its directory number as dialed digits by determining whether to employ a RemoteFeatureRequest Invocation or an OriginationRequest Invocation to connect the mobile station with the mobile station's voice messaging system.

2. The apparatus of claim 1 wherein the controller is an MSC.

3. The apparatus of claim 2 wherein the MSC comprises means for retrieving the indication that the apparatus is responsive to communications from a mobile station in which the mobile station sends its directory number as dialed digits by employing a RemoteFeatureRequest Invocation to connect the mobile station with the mobile station's voice messaging system.

4. The apparatus of claim 3 further comprising a means for determining whether RemoteFeatureRequest or OriginationRequest is to be used to provide access to a roaming station's voice mail system.

5. The apparatus of claim 3 further comprising a means for establishing a connection between a roaming mobile station and the mobile station's voice mail system.

6. The apparatus of claim 5 further comprising a home location register (HLR) that is responsive to the reception of a RemoteFeatureRequest by returning a mobile station's voice mail system routing information in a return result.

7. The apparatus of claim 6 wherein the HLR is responsive to the reception of an OriginationRequest by returning a mobile station's voice mail system routing information in a return result.

8. A method comprising the steps of:
   storing RemoteFeatureRequest data in a mobile switching center (MSC), the RemoteFeatureRequest data indicating that a RemoteFeatureRequest Invocation should be employed to connect a roaming mobile station with the mobile station's voice mail system;
   retrieving the RemoteFeatureRequest data in response to the reception of a mobile station's directory number as the dialed digits from the same mobile station while that station is roaming; and,
   examining data within the MSC to determine whether a RemoteFeatureRequest Invocation or an OriginationRequest Invocation should be employed to provide access to the voice mail system for the mobile station.

9. The method of claim 8 further comprising the step of:
   sending a RemoteFeatureRequest Invocation to the mobile station's home location register (HLR) in response to the reception of a mobile station's directory number as the dialed digits from the same mobile station while that station is roaming if it is determined during the data examination that the RemoteFeatureRequest Invocation should be employed to provide access to the voice mail system for the mobile station.

10. The method of claim 8 further comprising the step of:
   sending an OriginationRequest Invocation to the mobile station's home location register (HLR) in response to the reception of a mobile station's directory number as dialed digits from the same mobile station while that station is roaming if it is determined during the data examination that the OriginationRequest Invocation should be employed to provide access to the voice mail system for the mobile station.

11. The method of claim 10 further comprising the step of:
   sending the mobile station's voice message center routing information to the MSC in a return result from the HLR.

12. The method of claim 11 further comprising the step of:
   the MSC connecting the mobile station to its associated voice message center using the sent routing information.

* * * * *